(12) United States Patent
Ohkawa et al.

(10) Patent No.: US 7,679,251 B2
(45) Date of Patent: Mar. 16, 2010

(54) STEPPING MOTOR

(75) Inventors: Takanori Ohkawa, Susono (JP);
Takashi Ida, Susono (JP); Osamu Kodaira, Susono (JP)

(73) Assignee: Mitsubishi Materials C.M.I. Corporation, Shizuoka (JP)

( * ) Notice: Subject to any disclaimer, the term of this patent is extended or adjusted under 35 U.S.C. 154(b) by 300 days.

(21) Appl. No.: 11/792,532

(22) PCT Filed: Sep. 12, 2005

(86) PCT No.: PCT/JP2005/016758

§ 371 (c)(1),
(2), (4) Date: Jun. 7, 2007

(87) PCT Pub. No.: WO2006/075420

PCT Pub. Date: Jul. 20, 2006

(65) Prior Publication Data

US 2008/0084125 A1    Apr. 10, 2008

(30) Foreign Application Priority Data

Jan. 13, 2005  (JP) ............................. 2005-006126

(51) Int. Cl.
*H02K 1/27* (2006.01)
*H02K 37/14* (2006.01)
(52) U.S. Cl. .................. 310/156.12; 310/43; 310/49.02
(58) Field of Classification Search .................. 310/43, 310/49 R, 156.08, 156.09, 156.12–156.13, 310/156.38, 49.02, 49.32
See application file for complete search history.

(56) References Cited

U.S. PATENT DOCUMENTS

| 3,119,941 A | * | 1/1964 | Guiot ........................ 310/49 A |
| 4,501,981 A | * | 2/1985 | Hansen ...................... 310/49 R |
| 6,034,455 A | * | 3/2000 | Goltz et al. ................... 310/90 |
| 7,196,444 B2 | * | 3/2007 | Hata et al. ..................... 310/90 |

FOREIGN PATENT DOCUMENTS

JP          58-87476           6/1983

(Continued)

*Primary Examiner*—Tran N Nguyen
(74) *Attorney, Agent, or Firm*—Wenderoth, Lind & Ponack, L.L.P.

(57) ABSTRACT

A stepping motor is disclosed which is capable of obtaining desired driving torque without sacrificing magnetic properties of a magnet with respect to a stator, reducing inertia mass of a rotor by decreasing a use amount of a magnet material, and thereby, can enhance driving performance including control responsiveness. In a stepping motor in which a plurality of stators (20A, 20B) around which coils (21) are wound are placed in an axial direction of a motor shaft (31), a rotor (30) is rotatably provided with a space at inner periphery sides of these stators (20A, 20B), the motor shaft (31) is placed in a center of the rotor (30), and the rotor (30) includes a rotor body (33) placed at an outer periphery of the motor shaft and a cylindrical magnet (32) integrally provided on an outer periphery of the rotor body and magnetized to form multi-poles in a circumferential direction, the stepping motor is characterized in that the cylindrical magnet (32) has at least its inner peripheral surface bulged inward in a diameter direction so that a portion corresponding to a central portion in the above described axial direction of each of the coils (21) becomes thicker than the other portions.

3 Claims, 3 Drawing Sheets

FOREIGN PATENT DOCUMENTS

| | | | |
|---|---|---|---|
| JP | 63265558 A | * | 11/1988 |
| JP | 4-39081 | | 4/1992 |
| JP | 6-80378 | | 11/1994 |
| JP | 9-289748 | | 11/1997 |
| JP | 9-289752 | | 11/1997 |
| JP | 10-42543 | | 2/1998 |
| JP | 2001-33932 | | 12/2001 |

* cited by examiner

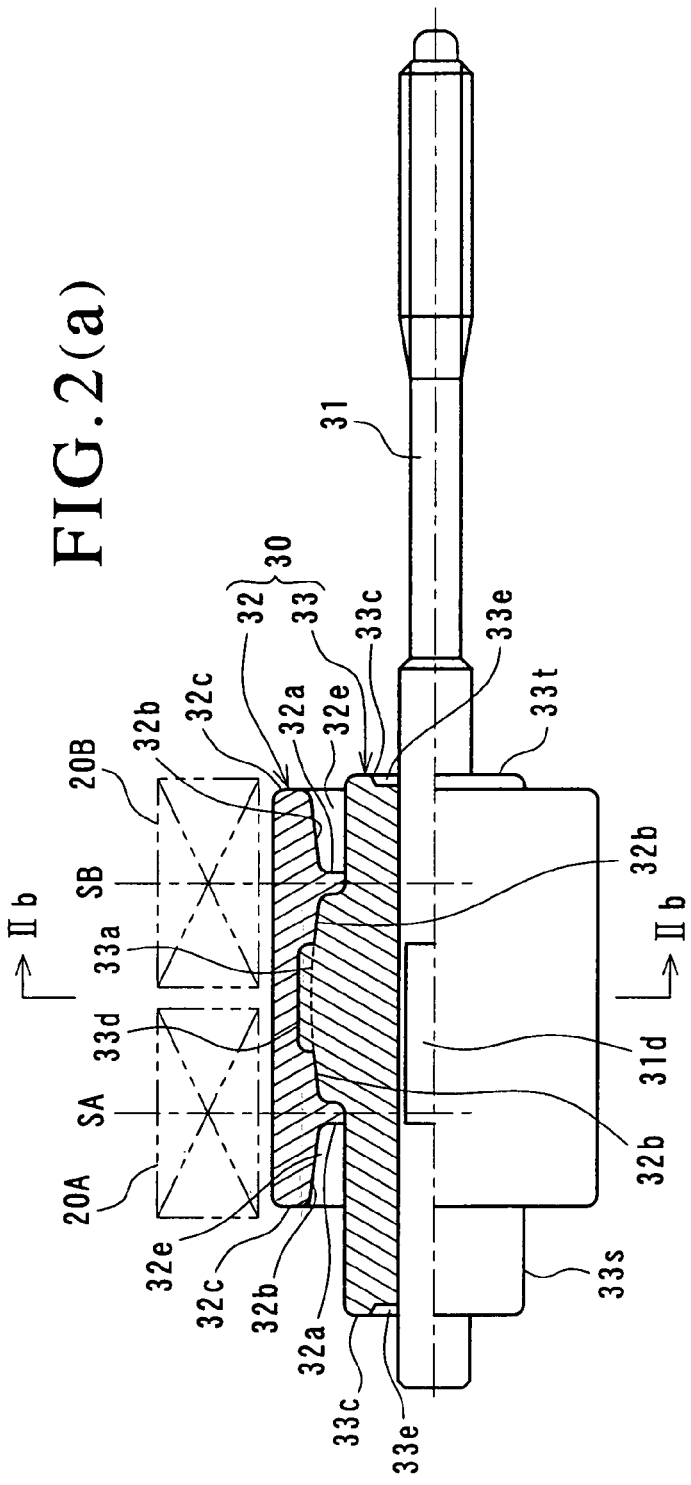
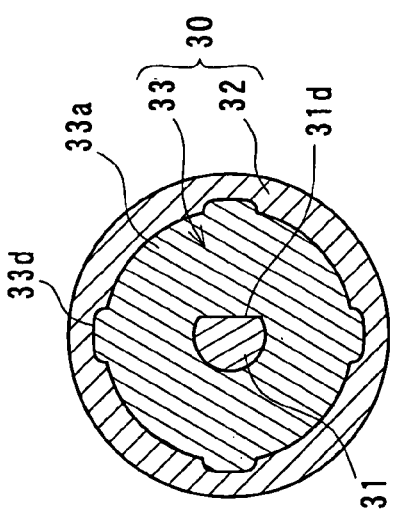

STEPPING MOTOR

TECHNICAL FIELD

The present invention relates to a PM type stepping motor which has a plurality of stators in an axial direction of a motor shaft and is rotatably provided with a rotor including a magnet inside these stators.

BACKGROUND ART

As one type of a stepping motor, a PM type (Permanent Magnet Type) stepping motor is widely known. The PM type stepping motor is one in which a magnet (permanent magnet) with magnetic poles placed in a circumferential direction is placed on an outer periphery of a rotor, and a stator including a driving coil is disposed around the magnet and, in general, stators of two phases are disposed to be aligned in a motor axial direction.

FIG. 3 shows a conventional PM type stepping motor of this kind seen in Japanese Patent Laid-Open No. 9-289152 described below.

The stepping motor is constructed roughly by a cylindrical rotor 52 integrally provided with a motor shaft 51 in a center, a stator unit 53 placed at an outer periphery of the rotor 52 via a predetermined gap, and a motor case 56 which rotatably supports the motor shaft 51 and the rotor 52 via bearings 54 and 55, and houses the rotor 52 and the stator unit 53 inside.

Here, the rotor 52 includes a multipolar magnet which is magnetized in a circumferential direction on its outer peripheral portion. The stator unit 53 includes stators 53A and 53B of two phases that are a phase A and a phase B, the stators 53A and 53B are constructed by pairs of yokes 61 having the number of poles corresponding to the number of magnetic poles of the magnet, coils 62A and 62B through which a controlled electric current passes, and resin bobbins 63. By switching the direction of the electric current which is passed through the coils 62A and 62B of the respective phases, polarity of the poles is changed, so that the rotor 52 including the magnet is synchronously rotated.

Incidentally, in the stepping motor of this type, a rotor 70 as shown in FIG. 4 is generally used. The rotor 70 is formed by integrally molding a rotor body 71 made of a synthetic resin on an outer periphery of a motor shaft 75, then by integrally molding a portion to be a magnet 72 on an outer periphery of the rotor body 71, after which, predetermined magnetization is performed to make the magnet 72, and the magnet 72 is formed into a cylindrical shape having a uniform wall thickness entirely. The main reason of adopting such a structure is to reduce the entire weight of the rotor 70 and reduce the production cost by reducing the use of the magnet material which is high in specific gravity and expensive.

However, in the above described conventional stepping motor, there is the problem that the magnetic force becomes small and desired driving torque cannot be obtained if the wall thickness is made small, when the entire magnet 72 is constructed to be of the same wall thickness as described above, though reduction in weight is achieved, and on the other hand, when the wall thickness is made large, the weight of the magnet 72 becomes heavy, as a result of which, there arises the problem that drive responsiveness becomes low due to increase in inertia mass of the rotor 70.

DISCLOSURE OF THE INVENTION

The present invention is made in view of the above circumstances, and an object of the present invention is to provide a stepping motor which can provide a desired driving torque without sacrificing magnetic performance of a magnet with respect to a stator, can reduce inertia mass of a rotor by decreasing a use amount of a magnet material, and thereby can enhance driving performance including control responsiveness.

According to the present invention, there is provided a stepping motor in which a plurality of stators around which coils are wound are placed in an axial direction of a motor shaft, a rotor is rotatably provided with a space provided at inner periphery sides of these stators, said motor shaft is placed in a center of the rotor, and said rotor includes a rotor body placed at an outer periphery of said motor shaft and a cylindrical magnet integrally provided on an outer periphery of the rotor body and magnetized to form multipoles in a circumferential direction, wherein said cylindrical magnet has at least its inner peripheral surface bulged inward in a diameter direction so that a portion corresponding to a central portion in the axial direction of each of said coils becomes thicker than the other portions.

In the stepping motor described above, said magnet is given a wall thickness distribution in said axial direction by its outer peripheral surface being constructed by a surface of a cylinder of a constant diameter, and the inner peripheral surface being provided with recessed and projected (that is, concavo-convex) portions along said axial direction.

In addition, said magnet is integrally molded on the outer periphery of said rotor body, and a plurality of projections are formed with a plurality of projected portions spaced in the circumferential direction on an outer periphery of a large diameter portion of the rotor body.

Further, said rotor is formed by integrally molding said rotor body on the outer periphery of said motor shaft, and by integrally molding said magnet on the outer periphery of the rotor body, and cavities recessed in said axial direction are formed in inner peripheral portions of end surfaces in said axial direction of said rotor body and/or said magnet.

According to the present invention described above, the wall thickness of the magnet is made large at the position corresponding to the central portion of the coil of each of the stators, and therefore, a strong magnetic force of the magnet can be obtained at the central portion of the above described coil which is the most effective in the magnetic properties. As a result, desired driving torque can be secured. Since the wall thickness on both sides of it is made smaller than that of the portion opposed to the above described central portion, the inertia mass of the rotor is reduced, and high responsiveness can be exhibited. In addition, by reducing the inertia mass of the rotor, reduction of wear of the bearing portion is made possible, and thereby, durability and reliability can be enhanced.

The bulged (or, expanded) portions inward in the diameter direction are formed on at least the inner peripheral surface so that the portions corresponding to the central portions in the axial direction of the coils are thicker than the other portions, and therefore, the large diameter portion of the rotor body is sandwiched between the bulged portions, as a result of which, integration (integration with respect to the external force especially in the motor axis direction) of the rotor body and the magnet can be enhanced.

In order to make the wall thickness of the magnet larger in the portions corresponding to the central portions of the coils than in the other portions, the mode in which the inner peripheral surfaces and the outer peripheral surfaces of the coils are bulged inward and outward in the diameter direction in the portions corresponding to the central portions of the coils is adopted, or the mode in which the outer peripheral surface of the magnet is formed to have a constant diameter, and by providing the recessed and projected portions along the axial direction on only the inner peripheral surface side, the wall thickness distribution in the axial direction is given can be adopted.

Further, according to the present invention, the outer peripheral surface of the magnet is made the cylindrical surface of the constant diameter, and therefore, the gap between the magnet and the stator can be accurately kept as in the prior art though the magnet is given the wall thickness distribution.

In addition, the magnet can be reliably prevented from idling in the circumferential direction of the magnet by the projection formed on the outer periphery of the rotor body.

Further, according to the present invention, the cavities are provided at the both end inner peripheral portions of the magnet constructed by a molded body and/or at the both end inner peripheral portions of the rotor body also constructed by a molded body, and therefore, even when a burr occurs to the border from the rotor body or the border from the motor shaft at the time of molding, the burr does not project to an outside from the end surfaces of the magnet and the rotor body. Therefore, when the bearing is fitted onto the outer peripheries of the rotor body and the motor shaft, the assembling operation can be easily performed without considering the influence of the burr.

BRIEF DESCRIPTION OF THE DRAWINGS

FIGS. 2(a) and 2(b) are schematic diagrams showing a rotor of the stepping motor by taking out the rotor, FIG. 2 (a) is a side view showing an upper half in section and FIG. 2(b) is a sectional view taken along the arrows IIb to IIb of FIG. 2(a);

DETAILED DESCRIPTION OF THE INVENTION

Hereinafter, an embodiment of the present invention will be explained with reference to the drawings.

Figure 1:
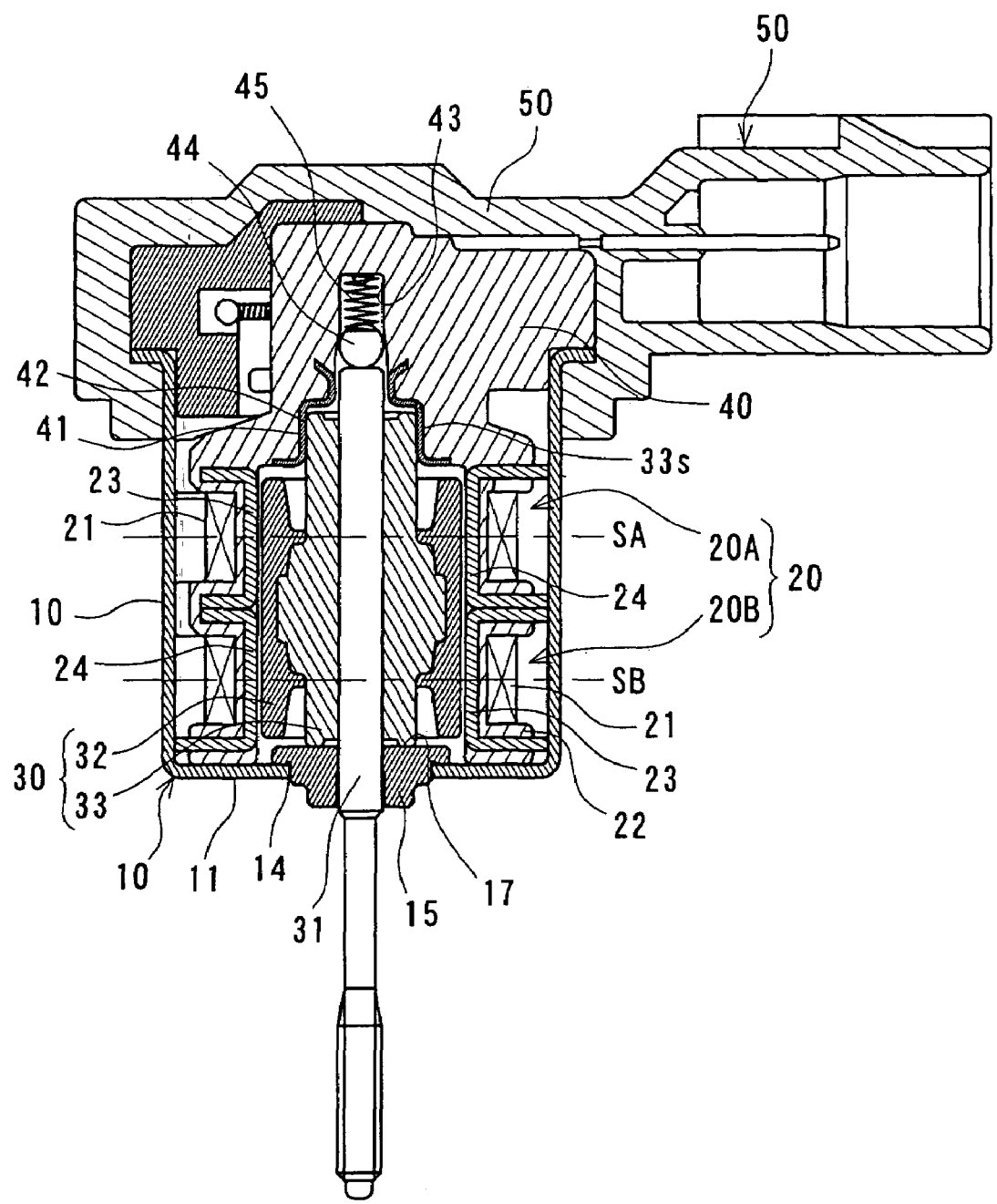
FIG. 1 is a sectional view showing an entire construction of a PM type stepping motor of an embodiment of the present invention.
Figure 3:
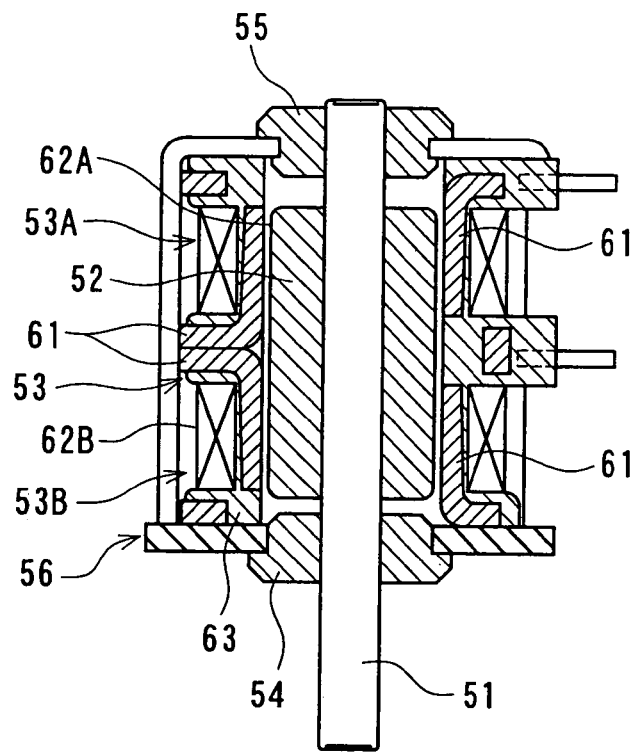
FIG. 3 is a sectional view showing an example of a conventional stepping motor.
Figure 4:
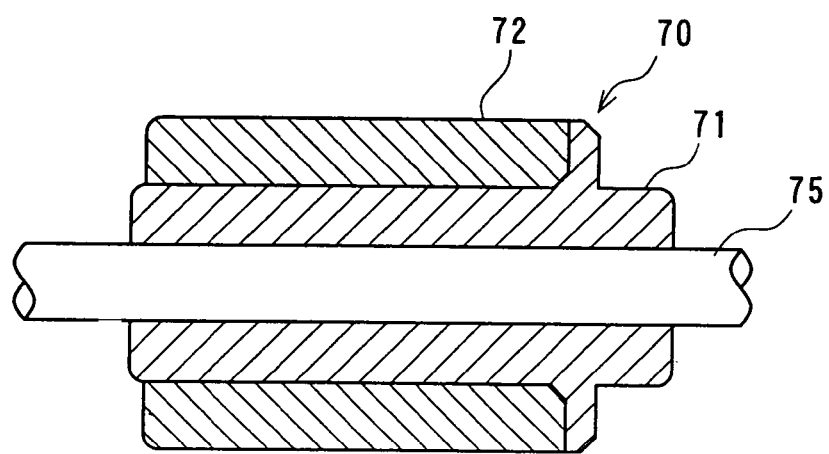
FIG. 4 is a sectional view of a rotor used in the conventional stepping motor.

FIG. 1 is a sectional view showing an entire construction of a PM type stepping motor of the embodiment, FIGS. 2 (a) and 2 (b) are schematic diagrams of a rotor of the same stepping motor by taking out it, FIG. 2(a) is a side view showing an upper half part in section and FIG. 2(b) is a sectional view taken along the arrows IIb to IIb in FIG. 2(a).

A stepping motor is generally a device which converts an electric pulse signal into a step operation of mechanical interruption, and the PM type stepping motor shown here is constructed to synchronously rotate a rotor magnet which is magnetized in a circumferential direction to form multipoles by switching an electric current passed through a stator coil.

The stepping motor is constituted of a motor case 10 made of magnetic metal (for example, iron), a stator unit 20 including stators 20A and 20B of two phases that are an A-phase and a B-phase each constituted of a coil 21, a bobbin 22, and a pair of yokes (also called stator cores) 23, 24, a rotor 30 and a motor shaft 31 placed in the center of the rotor 30, a resin lid body 40 including inside a bearing part 42 which supports a rear end of the rotor 30, and a mold resin part 50 which integrally constructs a housing of a waterproof connector, designated at 50, by being molded finally in the assembly process.

The stator unit 20 and the lid body 40 are integrated before being assembled to the motor case 10. In this case, the bobbin 22 and the lid case 40 are constructed of a solid resin, and the bobbin 22 and the lid body 40 are simultaneously molded (insert-molding) with the yokes 23 and 24 inserted in the mold. In this state, a coil 21 is wound around the bobbin 22, whereby the stator unit 20 integrated with the lid body 40 is constructed.

The motor case 10 forms a cylindrical cup shape having a closed tip end wall 11, a bearing hole 14 is provided in a center of the tip end wall 11, a bearing bush 15 is fitted in and fixed to the bearing hole 14, and a thrust bearing surface 17 orthogonal to the motor axis direction is formed at an end surface of the bearing bush 15 at an inside of the case. The rotor 30 is inserted into the inside of the motor case 10 from a rear end opening of the motor case 10, and a tip end of the motor shaft 31 fixed to the center of the rotor 30 penetrates through the ring-shaped bearing bush 15 to be slidable and rotatable. The stator unit 20 is located at an outer periphery of the rotor 30 and is inserted into an inner periphery of the motor case 10.

The PM type stepping motor is a claw pole type, in which the stators 20A and 20B of two phases are adjacently disposed in the motor axis direction. Each of the stators 20A and 20B of the respective phases is constructed into a cylindrical shape by disposing the paired yokes 23 and 24 at both end surfaces in the motor shaft direction of the bobbin 22 around which the ring-shaped coil 21 is wound. A pole tooth located at an inner peripheral surface of the bobbin 22 is integrally formed at each of the paired yokes 23 and 24. Each pole tooth is provided equidistantly in the circumferential direction, and the pole teeth of the paired yokes 23 and 24 are arranged in the circumferential direction so as to be alternately meshed with each other. The stators 20A and 20B of the respective phases thus constructed are integrated as the stator unit 20 in a state combined back to back, and are inserted into the motor case 10 in this state.

The rotor 30 in this case is constructed by a rotor body 33 molded of a resin material on the motor shaft 31 and a cylindrical magnet 32 which is molded on an outer periphery on the rotor body 33 that is molded in advance and thereafter, is magnetized in a circumferential direction to form multipoles.

In FIGS. 2(a) and 2(b) which are enlarged views showing a construction of the rotor 30, the cylindrical magnet 32 of the rotor 30 is given a wall thickness distribution in an axial direction of the motor shaft corresponding to the stators 20A and 20B of two phases. Namely, the wall thicknesses at the positions corresponding to centers SA and SB of the coils 21 in the axial direction in the respective stators 20A and 20B are set to be large, and the wall thicknesses at both sides are set to be smaller than them. More specifically, an outer peripheral surface of the magnet 32 is constructed by a surface of a cylinder with a constant diameter, and thus, the wall thickness distribution is made by providing recessed and projected portions along the motor shaft direction on the inner peripheral surface of the magnet 32. Annular projected parts (bulged parts) 32a are formed on the inner peripheral surface of the parts of the large wall thicknesses of the magnet 32, and the inner circumferential surfaces at both sides of the annular projected part 32a is constructed by a taper surface 32b which becomes larger in diameter as it leaves from the annular projected part 32a.

Since the recessed and projected portions are formed on the inner peripheral surface of the magnet 32 as described above, recessed and projected portions along the motor axis direction are formed in advance on the outer peripheral surface of the rotor body 33, which is previously formed, at the stage of molding the rotor body on the motor shaft 31. In this case, the portion between the two annular projected parts 32a on the inner peripheral surface of the magnet 32 becomes a recessed part, and therefore, a large diameter part 33a for forming the recessed part is formed on the outer peripheral surface of the rotor body 33. The material of the magnet 32 is molded on the outer periphery of the rotor body 33 in this state, and thereby, the large diameter part 33a of the rotor body 33 is sandwiched between the two annular projected parts 32a. As a result, integration (integration especially with respect to the external force in the motor axis direction) of the rotor body 33 and the magnet 32 is strengthened.

A cavity 32e recessed inward from a position of an end surface 32c of the magnet 32 is provided at each inner peripheral part of both ends of the magnet 32 at an outer side of each of the annular projected parts 32a. This is provided to prevent a burr from projecting to an outside from the end surface 32c of the magnet 32 even when the burr occurs to the border from the rotor body 33 at the time of molding. By providing the cavities 32e, the assembling operation can be easily performed without considering an influence of the burr even when the bearing and the like are fitted onto the outer periphery of the rotor body 33. For the same reason, cavities 33e recessed inward from a position of an end surface 33c of the rotor body 33 are formed at the inner peripheral portions at both ends of the rotor body 33.

A D-cut portion 31d which functions as a stopper of rotation with the rotor body 33 molded on the motor shaft 31 is provided on the outer periphery of the motor shaft 31, and a plurality (four in the drawing) of projections 33d which function as stoppers of the rotation with the magnet 32 molded on the rotor body 33 are provided equidistantly in the circumferential direction.

As shown in FIG. 1, a first slide surface 33s constituted of a cylindrical surface parallel with the motor axis direction is formed on an outer periphery of a rear end portion of the rotor body 33. A second slide surface 33t orthogonal to the motor axis direction is formed at a tip end surface of the rotor body 33. The second slide surface 33t slidably faces the thrust bearing surface 17 of the bearing bush 15.

The above described lid body 40 is fitted in a rear end opening of the motor case 10 and has a recessed part 41 in a center at an inner surface side. A bearing part 42 constituted of a cylindrical surface parallel with the motor shaft direction is formed at an inner peripheral surface of the recessed part 41, and after the rotor 30 is assembled to the motor case 10, the lid body 40 is fitted onto a rear end opening of the motor case 10, whereby the first slide surface 33s of the rotor body 33 is slidably fitted in the bearing part 42 of the lid body 40, and thereby, the rear end portion of the rotor 30 is rotatably supported by the lid body 40.

A small hole 43 is provided in a bottom surface of the recessed part 41 of the lid body 40, and a pressing spring 45, which causes the thrust bearing surface 17 of the bearing bush 15 to press the second slide surface 33t at the tip end of the rotor body 33 by pressing a rear end surface of the motor shaft 31 via a steel ball 44, is housed inside the small hole 43.

In this stepping motor, the wall thicknesses of the magnet 32 at the side of the rotor 30 at the positions corresponding to the centers SA and SB in the axial direction of the coils 21 of the respective stators 20A and 2GB are set to be large, and the wall thicknesses of both sides of them are set to be small. Therefore, a strong magnetic force of the magnet 32 can be obtained at the central portion of the coil 21 which is the most effective in terms of magnetic properties, and thereby, desired driving torque can be obtained. The wall thicknesses at both sides thereof are made gradually smaller than the portions opposed to the above described central portions, and therefore, inertial mass of the entire rotor 30 is decreased to be able to exhibit high responsiveness. In addition, reduction in wear of the bearing part is made possible by reduction in inertia mass of the rotor 30, whereby durability and reliability can be enhanced.

Especially in the stepping motor of this embodiment, the annular projected parts 32a on the inner peripheral surface of the magnet 32, namely, the portions with the maximum wall thickness of the magnet 32 are located at the centers SA and SB of the respective stators 20A and 2GB. Therefore, the maximum of magnetic efficiency between the stators 20A and 20B and the rotor 30 can be derived, and high responsiveness can be realized. Because the wall thicknesses of the magnet 32 at the positions corresponding to the centers SA and SB of the respective stators 20A and 2GB are maximized, the wall thicknesses of the magnet 32 at both sides thereof can be changed to be gradually thinner smoothly, by forming the taper surfaces 32b at both sides of the annular projected part 32a. Therefore, the conspicuous volume distribution with the positions corresponding to the centers SA and SB of the respective stators 20A and 2GB as apexes can be given to the magnet 32, which can significantly contribute to the enhancement in the characteristics of the stepping motor.

INDUSTRIAL APPLICABILITY

According to the present invention, it is possible to provide a desired driving torque without sacrificing magnetic performance of the magnet with respect to the stator, and reduce inertia mass of the rotor by decreasing a use amount of the magnet material, and thereby to enhance driving performance including control responsiveness.

The invention claimed is:

1. A stepping motor comprising:
a motor shaft;
a plurality of stators around which coils are wound, said stators being placed in an axial direction of said motor shaft; and
a rotor which is rotatably disposed such that a space is provided between said rotor and inner peripheral sides of said stators,
wherein said motor shaft is disposed in a center of said rotor,
wherein said rotor includes a rotor body disposed at an outer periphery of said motor shaft and a cylindrical magnet integrally provided on an outer periphery of said rotor body, said cylindrical magnet being magnetized to form multipoles in a circumferential direction,
wherein said cylindrical magnet has at least an inner peripheral surface bulged inward in a diameter direction such that a portion corresponding to a central portion in an axial direction of each of said coils is thicker than the other portions,
wherein said rotor body includes a large diameter portion,
wherein said cylindrical magnet is integrally molded on said outer periphery of said rotor body, and
wherein a plurality of projections are formed with a plurality of projected portions spaced in a circumferential direction on an outer periphery of said large diameter portion of said rotor body.

2. The stepping motor according to claim 1, wherein said cylindrical magnet has a wall thickness distribution in said axial direction of said motor shaft, said wall thickness distribution being formed by an outer peripheral surface of said cylindrical magnet being formed as a cylinder of a constant diameter, and said inner peripheral surface of said cylindrical magnet being provided with recessed and projected portions along said axial direction.

3. The stepping motor according to claim 1, wherein said rotor is defined by said rotor body having an inner periphery integrally molded on said outer periphery of said motor shaft, and said outer periphery of said rotor body is integrally molded with said cylindrical magnet, and wherein said rotor has cavities recessed in said axial direction, said cavities being formed in inner peripheral portions of end surfaces of said rotor, and extending in an axial direction of said rotor body and/or said cylindrical magnet.

* * * * *